UNITED STATES PATENT OFFICE.

ROSWELL D. CLARK, OF CORTEZ, NEVADA.

PROCESS OF EXTRACTING GOLD AND SILVER.

SPECIFICATION forming part of Letters Patent No. 387,492, dated August 7, 1888.

Application filed December 19, 1887. Serial No. 258,404. (No specimens)

*To all whom it may concern:*

Be it known that I, ROSWELL D. CLARK, of Cortez, Lander county, State of Nevada, have invented an Improvement in the Process of Extracting Gold and Silver; and I hereby declare the following to be a full, clear, and exact description of the same.

My invention relates to a process for the extracting of gold and silver from ores containing either gold alone or gold and silver together, it being of the greatest value in the extraction of gold, although it may also be used for silver.

It consists in the use of iron or copper matte in connection with the roasting of the ores.

In carrying out my process I find that the ore to which my process is best suited is that found in such large quantities in the Black Hills, Dakota, and which is known to metallurgists as "refractory" dry gold ores. Owing to the large amount of silica found in such ores it has been impossible to smelt them profitably, nor have they been successfully treated by any known method to obtain the best results until treated in the manner I will hereinafter describe.

The ore is first crushed by any suitable crushing apparatus and passed through a screen of twenty or thirty meshes to the inch. The ore is then mixed with from three to six per cent. of salt and about the same quantity of iron or copper matte. This may either be made from pyrites of iron or pyrites of copper, or it may be obtained directly from smelting-furnaces. By "copper matte" I mean protosulphide of copper—that is, one equivalent of copper to one equivalent of sulphur—and by "iron matte" I mean protosulphide of iron—that is, one equivalent of iron to one equivalent of sulphur. The ore with these ingredients added is then placed in a reverberatory or mechanical roasting-furnace—such as the Bruckner rotating-cylinder furnace—and is roasted for chlorination. The ore is roasted in about the same manner as is required for silver ores, and after the roasting is completed it is discharged from the furnace, cooled and dampened in the usual manner, and then put into vats and leached with a solution of hyposulphite of soda. The roasting must not be carried to the point of calcination but only to a "cherry-red" heat, as a higher temperature reduces the chlorides of gold to a metallic state, which would defeat the object of this process, which is to leach out the gold, as hereinafter described. By this means the greater part of the gold and silver is dissolved, and may be precipitated in the usual manner by the use of sulphide of calcium. These sulphides are then collected, dried, and roasted, and melted into bars in the usual manner. The tailings are then run through amalgamating-pans without grinding, and from fifty to seventy-five per cent. of the remaining gold is extracted by the use of quicksilver.

This process, on a large number of working tests, gives me a saving of from eighty-five to ninety-five per cent. on the silver, and from eighty-five to ninety per cent. on the gold, and all at a very low cost for treatment.

The advantage of my process lies in the fact that matte gives the necessary chlorination, which cannot be produced when pyrites or sulphur in any other combination are used. Pyrites of iron or of copper contain two equivalents of sulphur to one of the metal, and when roasted the sulphur is volatilized and driven off at a comparatively low temperature. If these pyrites are mixed with gold-bearing ore and salt and the mass is roasted, as above described, the sulphur will be driven off before the temperature of the metal becomes high enough to chloridize properly. When a matte is formed from pyrites, only one equivalent of the sulphur is driven off and the other remains, forming a protosulphide. This protosulphide of iron or copper, or a mixture of the two, does not give up its equivalent of sulphur until a high temperature is reached. The reaction which takes place when it is mixed with the ore and salt is as follows: The sulphur being released from the matte forms sulphuric acid, and in the decomposition of the chloride of sodium forms sulphate of soda and releases the chlorine. This only takes place at so high a temperature that the gold is in condition to be chloridized, and this result is thus accomplished. In many practical tests the saving of gold by this process amounted to eighty per cent., and of silver ninety-four cent. by leaching alone, and with subsequent amalgamation from fifty to seventy-five per cent. of the remaining gold is recovered.

By leaching with the hyposulphite of soda the gold in the tailings which is not taken up into the solution is cleaned and made bright, so that it is easily amalgamated and is very applicable to such ores as contain gold in a condition which prevents its being saved either by the amalgamated copper plates or other amalgamating processes.

Having thus described my invention, what I claim as new, and desire to secure by Letters Patent, is—

The improvement in chloridizing gold or gold and silver in ores, consisting in mixing protosulphide of iron or of copper, also known as "matte," with the ore and salt, and roasting the same together preparatory to the subsequent leaching and amalgamating processes, substantially as herein described.

In witness whereof I have hereunto set my hand.

ROSWELL D. CLARK.

Witnesses:
S. H. NOURSE,
H. C. LEE.